(12) United States Patent
Huang (10) Patent No.: US 10,401,642 B2
(45) Date of Patent: Sep. 3, 2019

(54) EYEGLASSES HAVING SIMULATED MONOLITHIC LENS

(71) Applicant: TSAIR YUARN INDUSTRIAL CO., LTD., Tainan (TW)

(72) Inventor: Pao-Ming Huang, Tainan (TW)

(73) Assignee: Tsair Yuarn Industrial Co., Ltd., Tainan (TW)

( * ) Notice: Subject to any disclaimer, the term of this patent is extended or adjusted under 35 U.S.C. 154(b) by 0 days.

(21) Appl. No.: 15/612,303

(22) Filed: Jun. 2, 2017

(65) Prior Publication Data

US 2018/0348540 A1 Dec. 6, 2018

(51) Int. Cl.
G02C 1/04 (2006.01)
G02C 5/12 (2006.01)
G02C 5/02 (2006.01)

(52) U.S. Cl.
CPC ............... G02C 1/04 (2013.01); G02C 5/02 (2013.01); G02C 5/12 (2013.01); G02C 2200/08 (2013.01)

(58) Field of Classification Search
CPC ........ G02C 1/04; G02C 2200/08; G02C 5/02; G02C 5/12
USPC .................. 351/103–109, 83, 85, 87–88
See application file for complete search history.

(56) References Cited

U.S. PATENT DOCUMENTS

| 5,182,586 | A  | * | 1/1993 | Bennato | G02C 1/04 351/128 |
| 7,524,055 | B2 | * | 4/2009 | Schepke | G02C 1/04 351/103 |
| 7,712,895 | B2 | * | 5/2010 | Wang    | G02C 1/04 351/106 |
| 8,201,939 | B2 | * | 6/2012 | Schepke | G02C 1/04 351/103 |
| 8,931,894 | B1 | * | 1/2015 | Chen    | G02C 1/10 351/103 |

FOREIGN PATENT DOCUMENTS

| TW | M315346 U | 7/2007 |
| TW | M381797 U1 | 6/2010 |

* cited by examiner

*Primary Examiner* — Zachary W Wilkes
(74) *Attorney, Agent, or Firm* — Rosenberg, Klein & Lee (57) ABSTRACT

A sunglasses having a simulated monolithic lens is disclosed. It comprises a shaded optical lenses assembly having two shaded optical lenses, each of the two shaded optical lenses having a connecting segment on a side thereof for correspondingly connecting to each other and an insertion segment extended from the connecting segment; a frame having an assembling groove disposed on the bottom edge thereof to engage upper edges of the shaded optical lenses for positioning; and a nose pad having a slot to correspondingly engage with middle lower edges of the shaded optical lenses assembly and a socket disposed on the slot for tightly accommodating the two insertion segments so as to stably connect the two shaded optical lenses and to form the sunglasses with a simulated monolithic lens.

6 Claims, 9 Drawing Sheets

EYEGLASSES HAVING SIMULATED MONOLITHIC LENS

BACKGROUND OF THE INVENTION

1. Field of the Invention

This invention relates to a pair of sunglasses having a simulated monolithic lens assembled by two shaded optical lenses.

2. Description of Related Art

Vision correction optical lenses are mainly made of concave lenses or convex lenses, and the thickness of the optical lenses is determined by severity levels of myopia or hyperopia. A pair of well-covered sunglasses is usually equipped with excellent effects of eyes covering. In order to achieve well covering effects to fit a user's face, high bending-degree of the lenses surface are needed. However, the bending-degree of the optical lenses surface is usually low, thus there are no sunglasses having monolithic optical lenses available on the market.

For instance, the Taiwan Pat. No. M381797 (U), issued on 1 Jun. 2010, disclosed a lenses structure comprising a first sunglasses lens shaped as a frame with two assembling holes thereon and a second optical lenses with a vision correction function correspondingly engaged with assembling holes. Accordingly, the lenses structure provides glare-shielding effects and a clear sight at the same time by the first sunglasses lens and the second optical lenses respectively. Although the lenses structure has advantages of providing various appearances by shaping the first sunglasses lens, a junction of the first sunglasses lens and the second optical lenses is obvious so that the integrity of the lenses structure is affected.

The Taiwan Pat. No. M315346 (U), issued on 11 Jul. 2007, disclosed a glasses fixation structure having an auxiliary frame. It mainly comprises an auxiliary frame having optical lenses mounted at an internal side of a main frame having sunglasses lenses. Accordingly, the auxiliary frame can be concealed by the sunglasses lenses and does not affect the overall appearance of this creation. However, this creation having an additional auxiliary frame mounted on the main frame increases the overall weight itself which may cause uncomfortable when a user wears the creation.

SUMMARY OF THE INVENTION

The present invention is aimed to provide a positive plan for improving the disadvantages of the Taiwan Pat. No. M381797 (U) and the No. M315346 (U).

The major purpose of this invention is to provide a sunglasses having a simulated monolithic lens assembled by two shaded optical lenses.

The sunglasses having a simulated monolithic lens of this invention is achieved by the following technical features.

It comprises a shaded optical lenses assembly, a frame and a nose pad, wherein:

the shaded optical lenses assembly has two shaded optical lenses, each of the two shaded optical lenses having a connecting segment on a side thereof for correspondingly connecting to each other and an insertion segment extended from the connecting segment;

the frame has an assembling groove disposed on the bottom edge thereof to engage upper edges of the shaded optical lenses for positioning; and the nose pad has a slot to correspondingly engage with middle lower edges of the shaded optical lenses and a socket disposed on the slot, wherein the socket has a width similar to a total width of the insertion segments of the two shaded optical lenses for tightly accommodating the two insertion segments so as to stably connect the two shaded optical lenses and to form a simulated monolithic lens of the sunglasses.

According to an embodiment of this invention, the frame and the nose pad are integrally formed as a single complete piece.

According to an embodiment of this invention, a fixing member is further provided to connect the frame to the nose pad.

The present invention has the following advantages:

The insertion segments extended from the connecting segments of the shaded optical lenses are correspondingly inserted into the socket on the slot of the nose pad for tightly accommodating the two shaded optical lenses, so the shaded optical lenses assembly achieves effect of being a simulated monolithic lens.

DETAILED DESCRIPTION OF THE PREFERRED EMBODIMENT

In the following detailed description, for purposes of explanation, numerous specific details are set forth in order to provide a thorough understanding of the disclosed embodiments.

Figure 1:
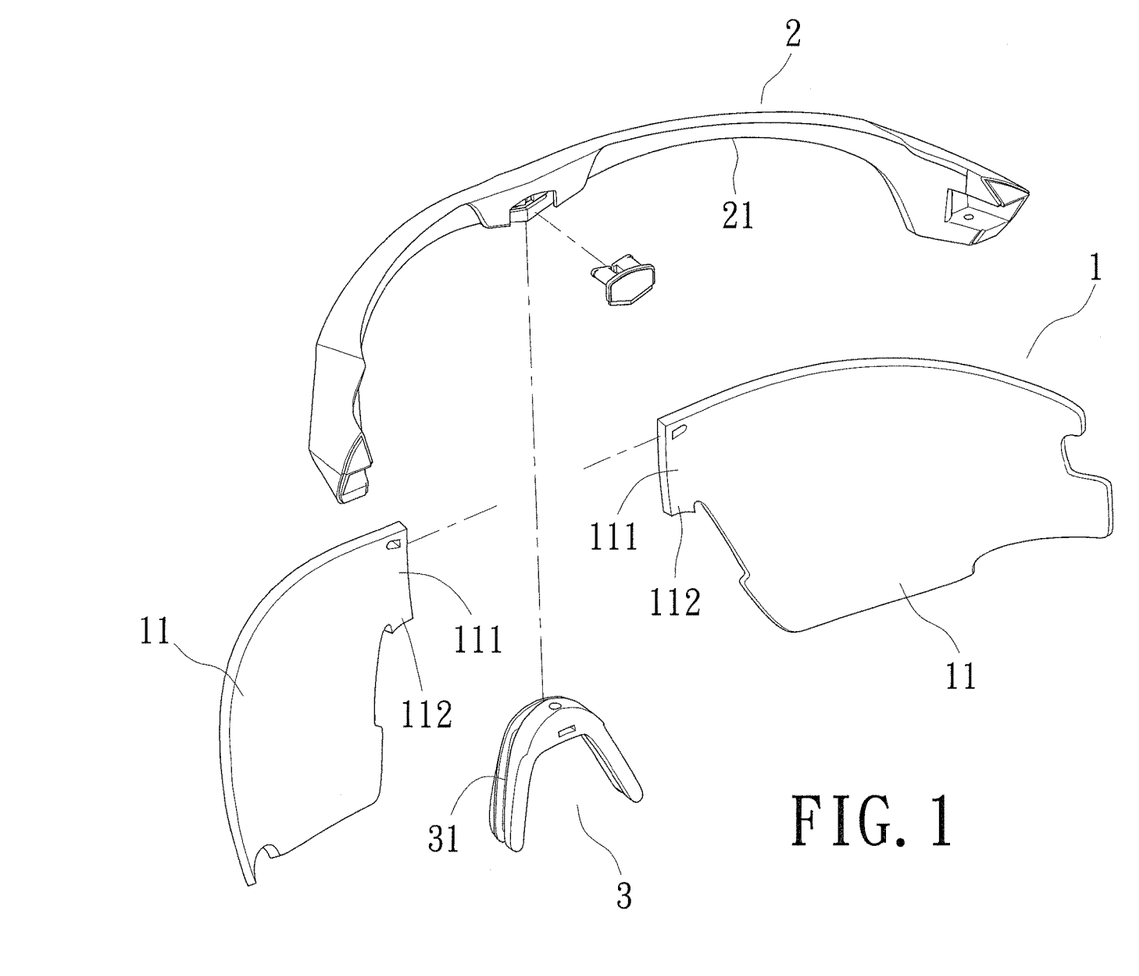
FIG. 1 is an exploded diagram showing a second embodiment of a sunglasses having a simulated monolithic lens according to the invention.
Figure 2:
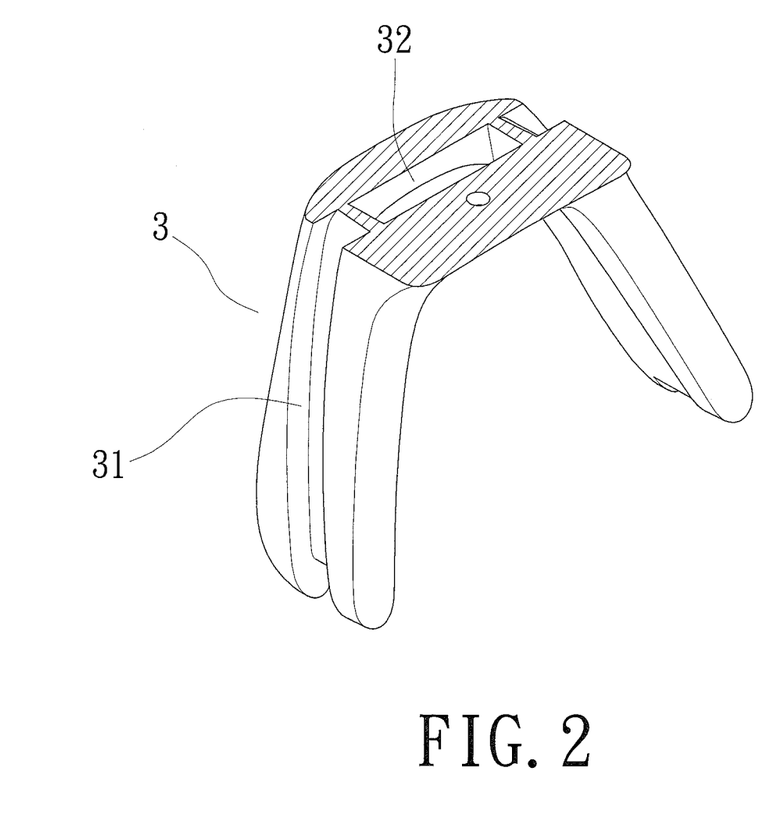
FIG. 2 is a stereogram showing a nose pad according to the invention.
Figure 3:
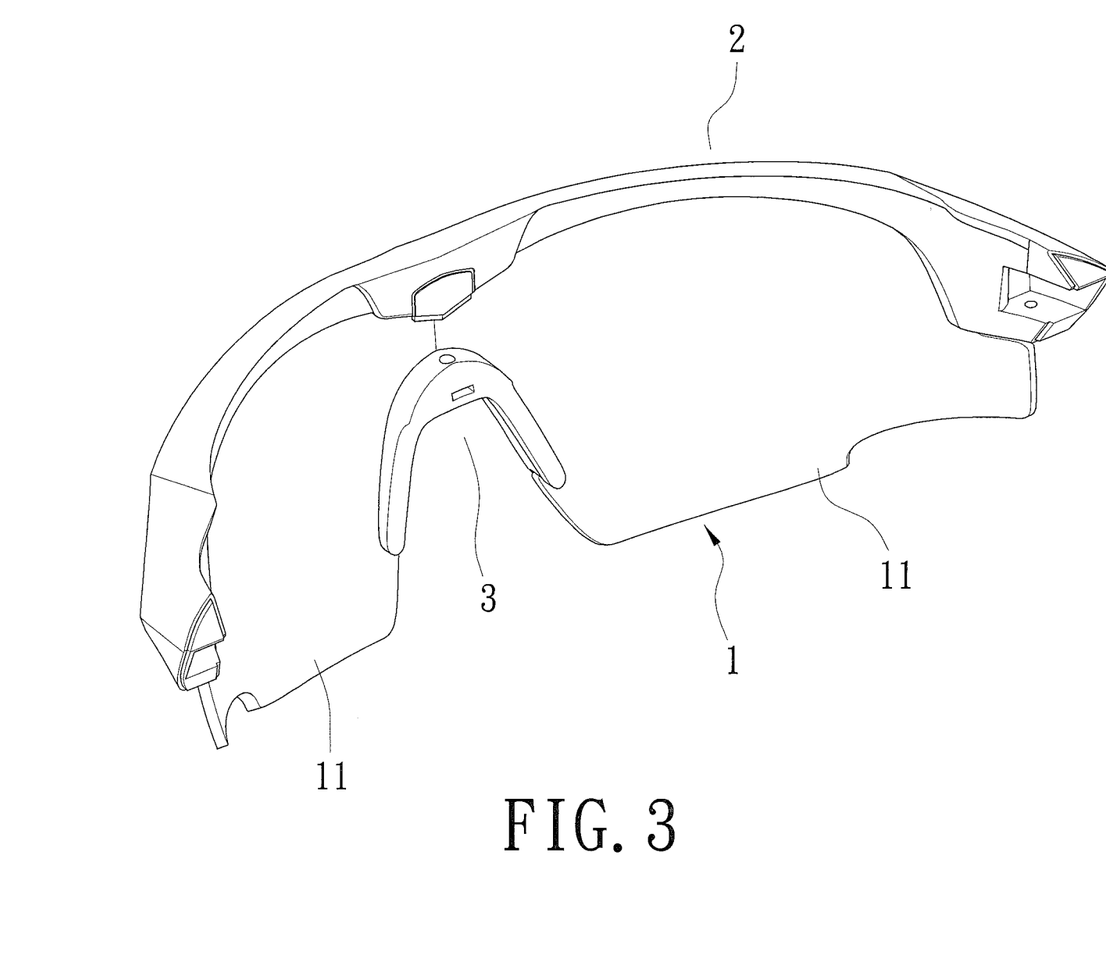
FIG. 3 is a stereogram showing the sunglasses having a simulated monolithic lens in assembly according to the invention.

Please refer to FIG. 1, FIG. 2 and FIG. 3.

A sunglasses having a simulated monolithic lens of this invention comprises a shaded optical lenses assembly (1), a frame (2) and a nose pad (3); wherein:

the shaded optical lenses assembly (1) has two shaded optical lenses (11), each of the two shaded optical lenses (11) having a connecting segment (111) on a side thereof for correspondingly connecting to each other and an insertion segment (112) extended from the connecting segment (111);

the frame (2) has an assembling groove (21) disposed on the bottom edge thereof to engage upper edges of the shaded optical lenses (11) for positioning; and the nose pad (3) has a slot (31) to correspondingly engage with middle lower edges of the two shaded optical lenses (11) and a socket (32) disposed on the slot (31) for accommodating the two insertion segments (112) of the two shaded optical lenses (11). Preferentially, the socket (32) has a width similar to a total width of the insertion segments (112) of the two shaded optical lenses (11) being assembled together.

Please refer to FIG. 2, FIG. 4~FIG. 6, which show the present invention in assembly. The upper edges of the two shaded optical lenses (11) is engaged with the assembling groove (21) disposed on the bottom edge of the frame (2), and the two shaded optical lenses (11) are connected to each other by the connecting segments (111). The middle lower edges of the shaded optical lenses (11) is then engaged with the slot (31) correspondingly, and the insertion segments (112) are further tightly accommodated by the socket (32) on the nose pad (3) so as to stably connect the two shaded optical lenses (11) and form a simulated monolithic lens.

In the first embodiment according to FIG. 1~FIG. 6, the frame (2) and the nose pad (3) are separated members which do not have any structure thereof to connect to each other. It means that the frame (2) and the nose pad (3) are disposed oppositely at two edges of the shaded optical lenses (11) and assembled to form a sunglasses having a simulated monolithic lens of this invention.

Figure 7:
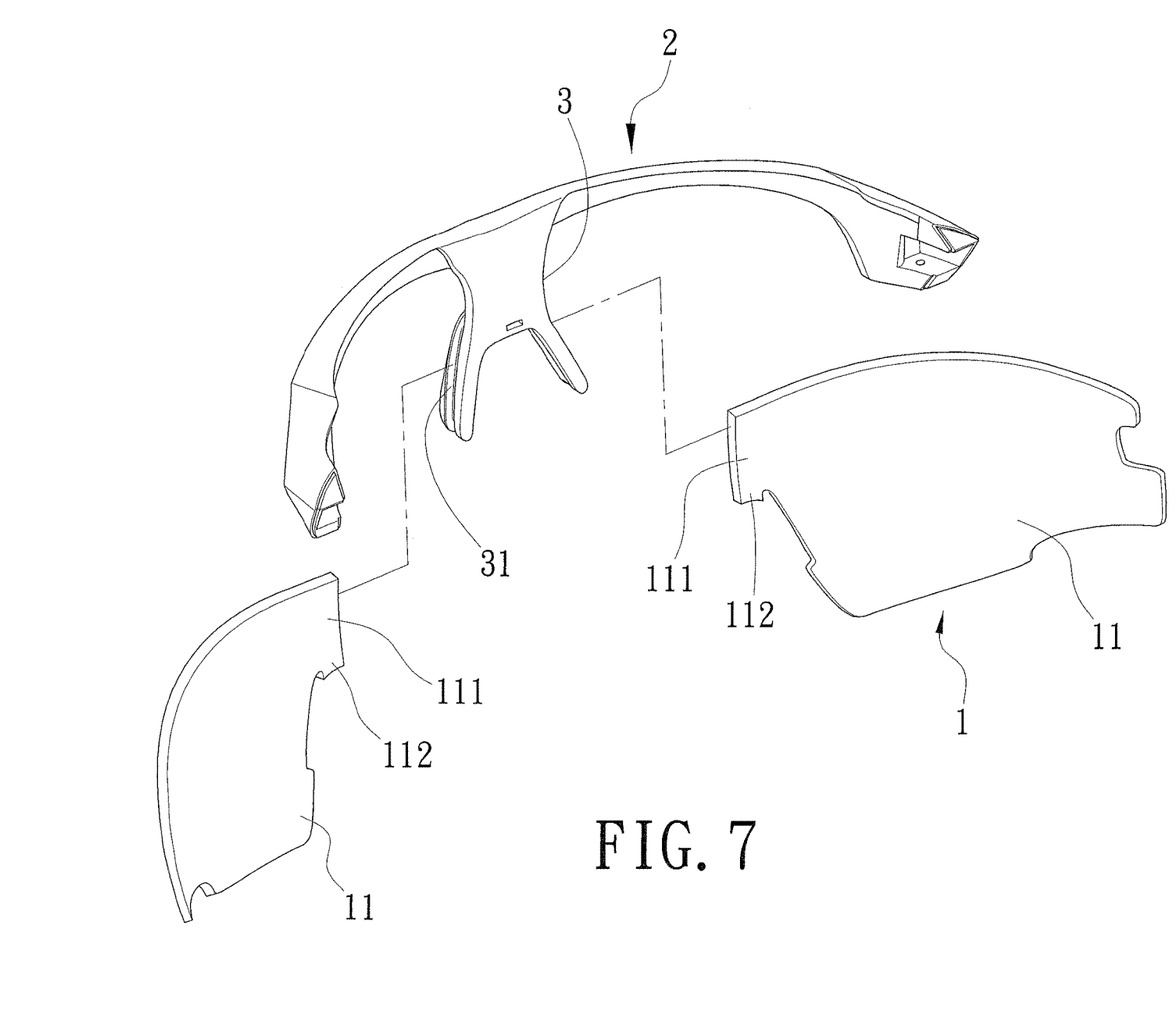
FIG. 7 is an exploded diagram showing a second embodiment of a sunglasses having a simulated monolithic lens according to the invention.
Figure 8:
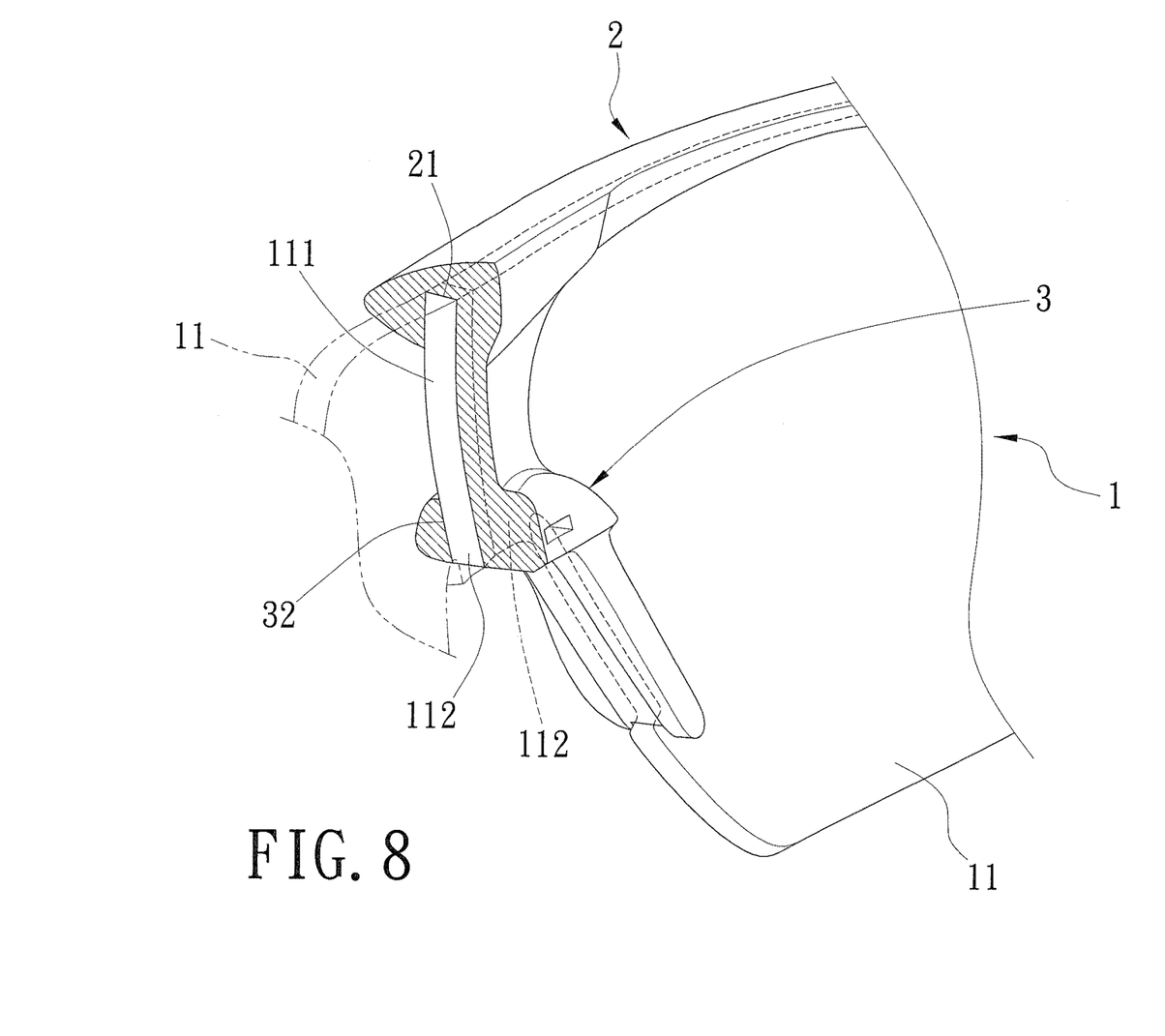
FIG. 8 is a partially cross-sectional view showing the second embodiment of the sunglasses having a simulated monolithic lens in assembly according to the invention.
Figure 9:
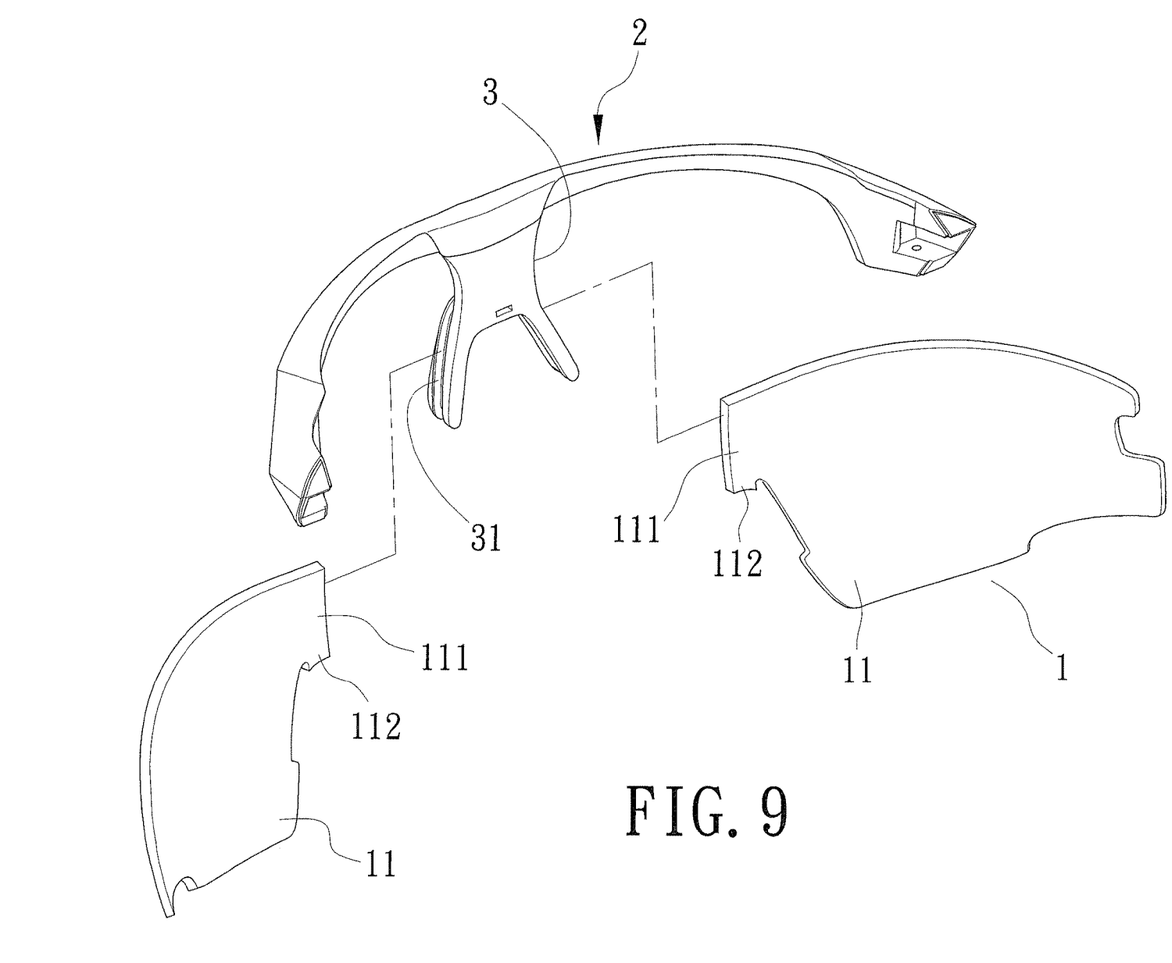
FIG. 9 is an exploded diagram showing a third embodiment of the sunglasses having a simulated monolithic lens according to the invention.

In the second embodiment according to FIG. 7 and FIG. 8, the frame (2) and the nose pad (3) are integrally formed as a single complete piece. Referring to FIG. 9, a fixing member is provided to connect the frame (2) and the nose pad (3).

Figure 4:
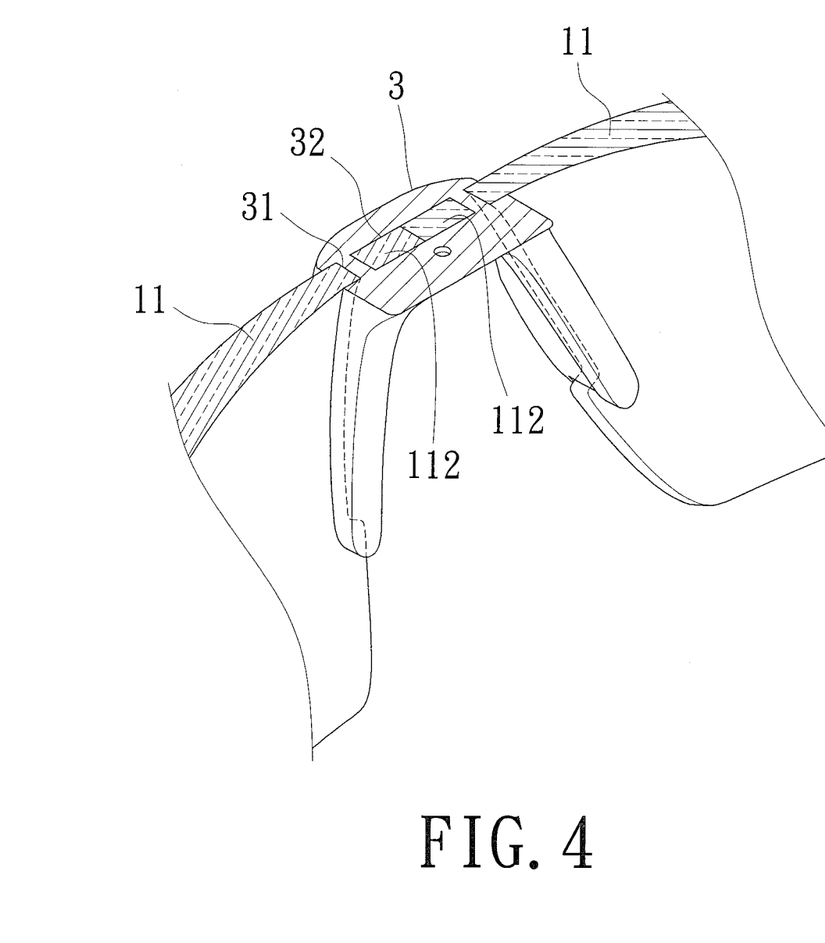
FIG. 4 is a first cross-sectional diagram showing the sunglasses having a simulated monolithic lens in assembly according to the invention.
Figure 5:
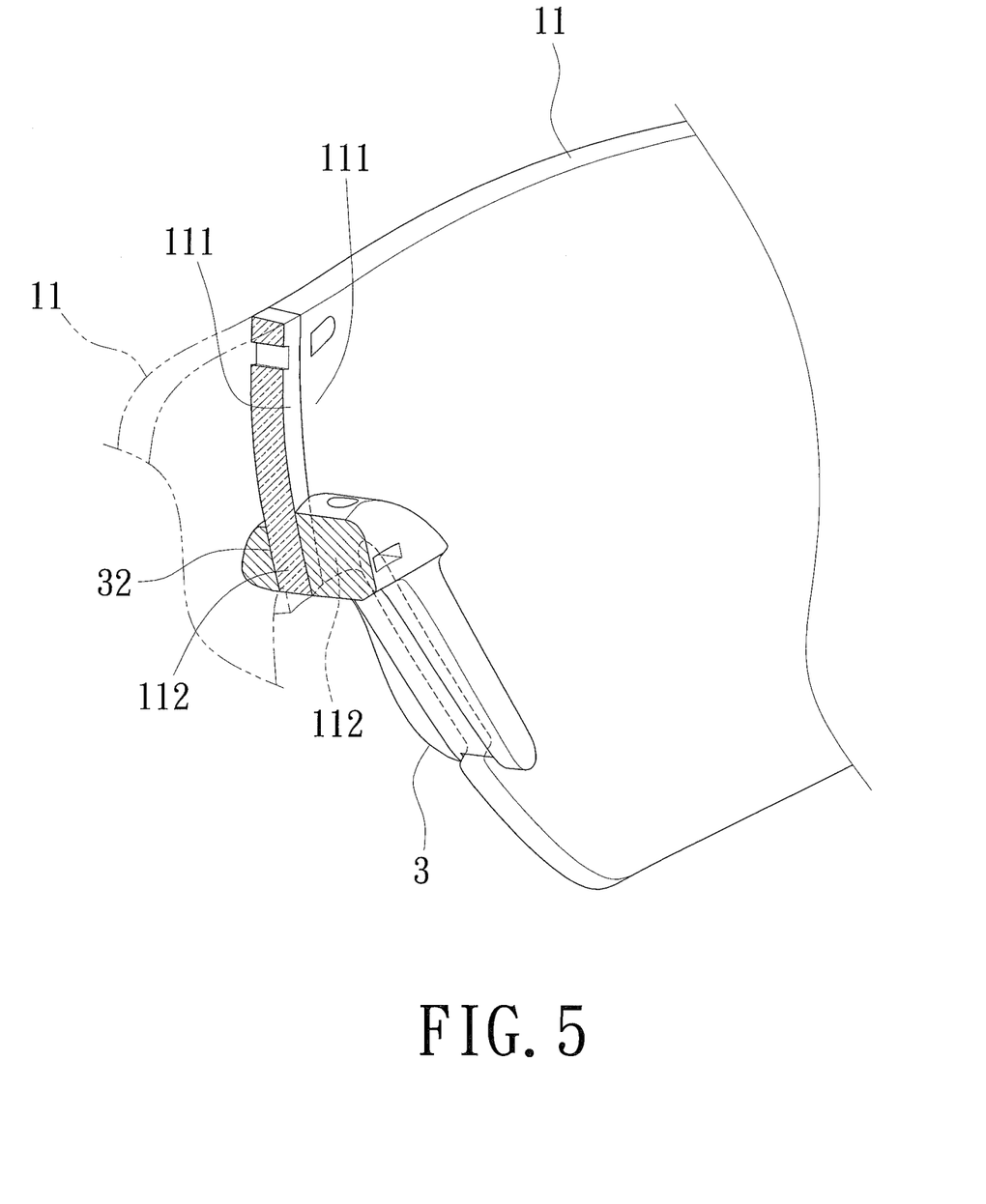
FIG. 5 is a second cross-sectional diagram showing the sunglasses having a simulated monolithic lens in assembly according to the invention.
Figure 6:
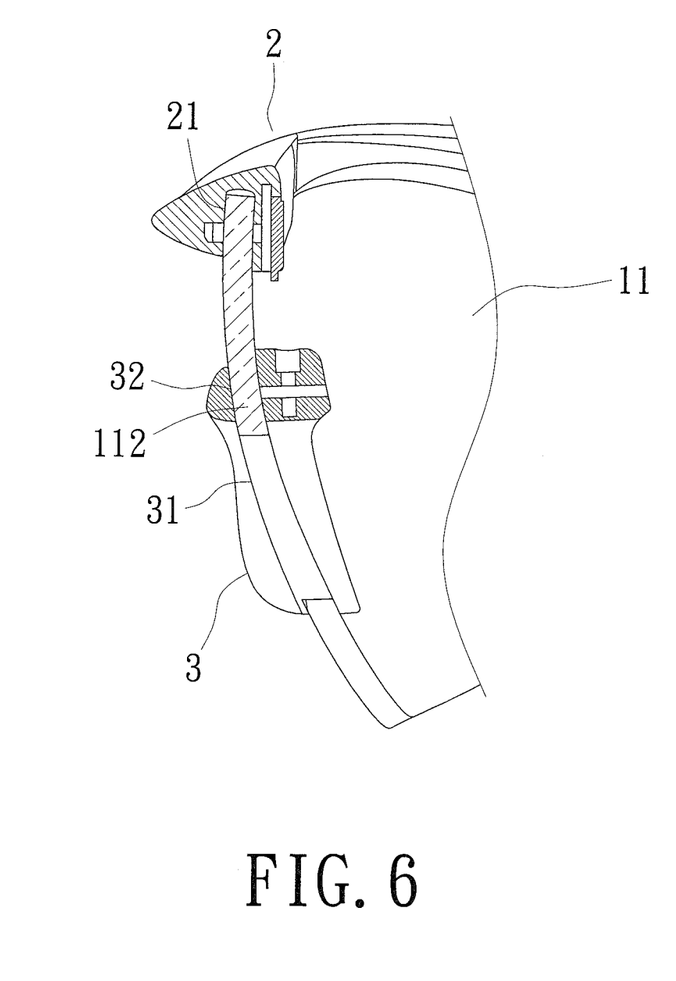
FIG. 6 is a partially enlargement lateral sectional view showing the sunglasses having a simulated monolithic lens in assembly according to the invention.

Referring to FIG. 4, the upper edges and the middle lower edges of the two shaded optical lenses (11) have less thickness for appropriately engaging with the assembling groove (21) of the frame (2) and the slot (31) of the nose pad (3) respectively. The design of less thickness edge is provided if the shaded optical lenses (11), e.g. myopia correction lenses, are made of concave lenses having much thickness edges used in myoporthosis.

What is claimed is:

1. Eyeglasses having a simulated monolithic lens, comprising:
   an optical lens assembly having two separate optical lenses, each of the two optical lenses having:
      a connecting segment on a side thereof for abutting against a corresponding connecting segment of the other optical lens, and
      an insertion segment extended from the connecting segment;
   a frame having an assembling groove disposed on the bottom edge thereof to engage upper edges of the optical lenses for positioning; and
   a nose pad having:
      a slot formed with said nose pad to correspondingly receive inner edges of the optical lenses, and
      a socket within an apex section of the nose pad in open communication with the slot and configured to fit a combined width of the insertion segments of the two optical lenses,
   wherein the insertion segments of the two optical lenses are assembled together and tightly accommodated within the socket so as to connect the two optical lenses to form a simulated monolithic lens of the eyeglasses.

2. The eyeglasses having a simulated monolithic lens of claim 1, wherein the frame and the nose pad are integrally formed as a single complete piece.

3. The eyeglasses having a simulated monolithic lens of claim 1, wherein a fixing member is further provided to connect the frame to the nose pad.

4. The eyeglasses having a simulated monolithic lens of claim 1, wherein the socket is centrally disposed on the nose pad.

5. The eyeglasses having a simulated monolithic lens of claim 1, wherein the two insertion segments engage each other within the socket.

6. The eyeglasses having a simulated monolithic lens of claim 1, wherein optical lenses are shaded optical lenses.

* * * * *